(12) United States Patent
Noel

(10) Patent No.: US 6,543,816 B1
(45) Date of Patent: Apr. 8, 2003

(54) THREADED TUBULAR JOINT PROOF TO EXTERNAL PRESSURE

(75) Inventor: Thierry Noel, Sebourg (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 09/857,192
(22) PCT Filed: Oct. 17, 2000
(86) PCT No.: PCT/FR00/02891
§ 371 (c)(1), (2), (4) Date: Jun. 20, 2001
(87) PCT Pub. No.: WO01/29476
PCT Pub. Date: Apr. 26, 2001

(30) Foreign Application Priority Data

Oct. 21, 1999 (FR) .............................................. 99 13385

(51) Int. Cl.$^7$ ............................................... F16L 25/00
(52) U.S. Cl. ..................... 285/333; 285/332.4; 285/391
(58) Field of Search .............................. 285/333, 332.1, 285/332.2, 332.3, 332.4, 391

(56) References Cited

U.S. PATENT DOCUMENTS

| | | | |
|---|---|---|---|
| 1,927,656 A | | 9/1933 | Eaton et al. |
| 4,009,893 A | * | 3/1977 | Schatton et al. .......... 285/332.3 |
| 4,026,583 A | * | 5/1977 | Gottlieb ................ 285/332.2 X |
| 4,253,687 A | * | 3/1981 | Maples .................... 285/332.3 |
| 4,431,219 A | * | 2/1984 | Brewer et al. .............. 285/333 |
| 4,521,042 A | * | 6/1985 | Blackburn et al. ...... 285/391 X |
| 4,673,201 A | * | 6/1987 | Dearden et al. ............ 285/333 |
| 4,679,831 A | * | 7/1987 | Kielminski .............. 285/332.2 |
| 4,705,307 A | * | 11/1987 | Chelette ................... 285/332.3 |
| 5,154,452 A | * | 10/1992 | Johnson ........................ 285/333 |
| 5,687,999 A | * | 11/1997 | Lancry et al. ............... 285/333 |
| 5,906,399 A | * | 5/1999 | Noel ..................... 285/333 X |
| 5,931,511 A | * | 8/1999 | DeLange et al. ....... 285/333 X |
| 6,347,814 B1 | * | 2/2002 | Cerruti ................... 285/333 X |

FOREIGN PATENT DOCUMENTS

| | | | | |
|---|---|---|---|---|
| EP | 127560 | * | 12/1984 | .............. 285/332.3 |
| GB | 2117469 | * | 10/1983 | .............. 285/332.2 |
| WO | WO 84/04352 | | 11/1984 | |

OTHER PUBLICATIONS

World Oil, vol. 213, No. 1, pp. 53 to 56, 58, 60, 75 to 78, 80, 82 and 88, "1992 Tubing Tables," Jan. 1992.

* cited by examiner

Primary Examiner—Lynne H. Browne
Assistant Examiner—David E. Bochna
(74) Attorney, Agent, or Firm—Oblon, Spivak, McClelland, Maier & Neustadt, P.C.

(57) ABSTRACT

A threaded pipe connector which may find application in the petroleum and gas industry, and pipe connections formed with the connector. The connector includes a male element disposed at the end of a first pipe and a female element disposed at the end of a second pipe. The male element is provided with an external tapered male threading and the female element is provided with an internal tapered female threading corresponding to the male threading. A central seal, formed by a male bearing surface and a female bearing surface and bearing against each other and disposed in a central zone of the male and female threading respectively where the threadings have been interrupted, seals the connector when the connector is assembled. The connector and the connected pipes formed from this connector provide a tight seal under high external pressures.

20 Claims, 7 Drawing Sheets

THREADED TUBULAR JOINT PROOF TO EXTERNAL PRESSURE

FIELD OF THE INVENTION

The present invention relates to a threaded connector for pipes, more particularly for steel pipes which is intended for the petroleum and gas industry and for connecting pipes produced from this connector, of particular importance because of its tight seal against high external pressures.

The present invention relates to a threaded connector for pipes, more particularly for steel pipes which is intended for the petroleum and gas industry and for connecting pipes produced from this connector, of particular importance because of its tight seal against high external pressures.

DESCRIPTION OF THE RELATED ART

Pipe connectors used in the petroleum and gas industry are known in which the junction is constituted by an externally threaded male element which screws into an internally threaded female element, the two male and female threads mating with each other. Such connectors are used to produce extraction pipe strings or casing pipe strings for petroleum and gas wells.

Pipe connectors used in the petroleum and gas industry are known in which the junction is constituted by an externally threaded male element which screws into an internally threaded female element, the two male and female threads mating with each other. Such connectors are used to produce extraction pipe strings or casing pipe strings for petroleum and gas wells.

Depending on the severity of the conditions of the petroleum and gas exploitation wells, the basic structure of the connectors described above is completed in known manner by providing them with a variety of types of sealing means such as rings of synthetic material or metallic surfaces which bear on each other.

An example which can be cited is described in European patent EP 0 488 912 which describes a tapered threaded connector provided with a male tapered surface in the zone located after the male thread close to the free end of the male element, and in the corresponding zone of the female element with a corresponding female tapered surface, this pair of male and female surfaces bearing on each other when the connector is in the made up position forming an internal sealing surface against fluid circulating inside the pipes. The connector described in EP 488 912 is also provided with an abutment which enables the two male and female threaded elements to be precisely positioned with respect to each other when making up.

For certain applications, the connectors must resist and remain sealed both to the internal fluid pressure circulating in the pipe and to the external pressure existing outside the pipe. Such a seal is critical for the reliability of the connector when the external pressure is high (for example over 600 bars), whether the fluid concerned is a liquid or a gas or a mixture of the two. In this case, beyond a given pressure the internal sealing surface such as that described in EP 488 912 cannot resist fluid penetration which advances from the exterior to the interior along the thread and can then deform or even break the male lip on which said internal sealing surface is located, and it thus infiltrates into the interior of the pipe.

To overcome this problem, it has been proposed to provide the type of connector described in EP 0 488 912 with a sealing surface located close to the free end of the female element.

French patent FR 77 12851 thus describes a connector provided with an internal sealing surface close to the free end of the male element and with an external sealing surface close to the free end of the female element. It should be tight to internal and to external pressure. However, according to FR 77 12851, each of those two sealing surfaces is associated with an abutment, which renders the function and manufacture of the connector much more difficult. Abnormal deformations can occur when dimensional tolerances are not entirely adhered to or when the makeup torque is too high, which deformations can fundamentally modify the function of the two sealing surfaces and cause them to lose tightness as regards the fluid inside the pipe and the fluid outside the pipe.

Producing such a connector is expensive, firstly because of the machining tolerances required for it to function properly and secondly because of the quantity of material necessary to produce both an internal sealing surface and an external sealing surface, requiring the use of thicker pipes.

The prior art also discloses connectors in which the male and female elements comprise a tapered or straight threading constituted by two radially and axially offset independent threaded zones (such threaded zones can also be termed steps) which are provided with sealing surfaces.

Such is the case in EP 0 767 335 which describes a connector which comprises a tapered threading with two independent radially and axially offset threaded zones, with an internal sealing surface close to the free end of the male element and an external sealing surface close to the free end of the female element. However, because of the situation of the external sealing surface close to the free end of the female element, this sealing surface cannot resist very high pressures as there is not sufficient material at the end of the pipe to keep said surface rigid.

Further, EP 0 149 612 describes a connector which comprises a threading with two radially and axially offset independent threaded zones with different tapers between which a sealing surface is provided constituted by male and female surfaces in bearing contact during makeup, that connector also comprising an internal sealing surface close to the free end of the male element and an oblique abutment at the free end of the male element.

Because of the structure of the two radially and axially offset independent threaded zones, the connector of EP 0 149 612 requires relatively thick pipe walls and because of the corresponding cost and bulk, it is difficult to envisage it being produced in the form of a coupling.

BRIEF SUMMARY OF THE INVENTION

The present invention seeks to provide a threaded pipe connector which, while being tight to external pressure, does not have the disadvantages of the above connectors.

The present invention seeks to provide a threaded pipe connector which, while being tight to external pressure, does not have the disadvantages of the above connectors.

Thus a connector is sought which is tight at high external pressures while remaining tight to internal pressure and which is simple, robust and economical both as regards the quantity of material and the thickness of the pipes which are required, and as regards machining.

The term "robust" means a connector which can resist high pressures, for example of the order of 600 bars to 1500 bars, and which is easy to assemble on-site.

The production of a threaded pipe connector has also been sought, which connector differs as little as possible from connectors which already exist, where the threading is constituted by a single threaded zone in contrast to threaded connectors wherein the threading comprises two independent axially and radially offset threaded zones, and which can be produced from such connectors with a single threaded zone without modifying the structure of the assembly.

A connector which has a single sealing means which can be used both against internal pressure and against external pressure has also been sought.

The connector of the invention is intended for the production of pipelines or strings.

Its field of application is not limited to the petroleum and gas industry but extends to any application where the same types of problems occur or can occur.

A non limiting example is geothermal liquid or vapour water extraction.

The connectors are produced from any metallic materials, for example steel or ferrous or non ferrous alloys in particular with the desired mechanical characteristics and with the corrosion strength required for the envisaged application.

The threaded pipe connector of the invention is of the type comprising a male element disposed at the end of a first pipe and a female element disposed at the end of a second pipe.

The male element comprises an external male threading constituted by a single male threaded zone and the female element comprises a female threading constituted by a single female threaded zone, the male threaded zone corresponding to the female threaded zone such that they can be made up one into the other.

The male and female threading are tapered and a stop means can stop makeup of the connector at a set position.

A sealing means is interposed between the male and female element, which means is constituted by a male bearing surface on the male element and a female bearing surface on the female element, these two bearing surfaces being capable of coming into bearing contact with each other when the connector is made up and being respectively disposed in a globally central zone of the male threaded zone for the male bearing surface and a globally central zone of the female threaded zone for the female bearing surface in which the respective male and female threadings are interrupted.

The term "globally central zones" of the male threaded zone and of the female threaded zone in which the male and female threadings are interrupted means a zone which is substantially at the mid point along the axis of the connector of the male and female threaded zone or in a portion which extends to either side of the mid point along the axis of the connector of the male and female threaded zone by a length of at most ¼ of the length along the connector axis of the threaded zone.

Advantageously, the male threaded zone and the female threaded zone will be considered to encompass both perfect threads and imperfect or vanishing or incomplete end threads.

In the following text, this sealing means will simply be termed the "central sealing means", it being understood that this term must not be interpreted restrictively having regard to the information provided.

The stop means which can stop makeup of the male element in the female element in a set position can be constituted either by means linked directly to the threadings or by means which are independent of the threadings.

Since the threadings are tapered, they naturally have an interference fit, and the stop means directly linked to the threadings can be constituted, as is already known, by makeup to a pre-set torque or by two marks, one located on the male element and one on the female element, which coincide at the end of makeup.

Regarding means which are independent of the threadings, the stop means can be an abutment which, in the desired position, opposes continued relative makeup of the male element into the female element.

Depending on the envisaged service conditions for the connector of the invention, the connector may comprise only one single sealing means as described above, the central sealing means, or in addition to this central sealing means it may also comprise a second sealing means.

This second sealing means is advantageously a means which is known per se such as a metal-metal bearing contact ensured by two bearing surfaces respectively disposed one close to the free end of the male element and the other on the corresponding portion of the female element.

The bearing surfaces of the central sealing means can be of any type or form provided that they can come into bearing contact with each other during makeup of the connector.

As an example two cylindrical surfaces can be used, the male bearing surface being of a slightly higher diameter than the diameter of the female bearing surface to ensure an interference fit of the two surfaces when made-up, creating the seal.

It is also possible to use at least one cylindrical surface, the other surface being toric, for example, or of any nature which can bring about an interference contact with the former.

The male bearing surface and the female bearing surface do not necessarily have the same type of geometry.

Advantageously, at least one of the bearing surfaces of the central sealing means, the male surface or the female surface, is constituted by a tapered surface the taper of which is in the same direction as the threading taper but wherein advantageously the angle with respect to the common axis of the male element and the female element is higher than the angle of the thread taper with respect to this axis.

By way of non limiting example, the contact distance between the male and female bearing surfaces of the central sealing means can be in the range 1 to 10 mm.

The threadings of the male and female elements can be of any type, such as for example triangular or trapezoidal API (American Petroleum Institute) threadings, the latter ones being termed "buttress" by the API, world known designation and the use of which is common to the man of art to design said type of threadings.

In the case of a buttress threading, they may have negative load flanks, in particular when associated with an abutment, to enable the threadings to engage together better.

The present invention also relates to a threaded connection for two pipes using the connector of the invention, the structure of which has been described above.

A number of variations are possible.

In a first variation, the connection is integral, each pipe to be connected carrying alternately at each of its ends a male element and a female element of the connector of the invention, as described above.

Thus the integral connection of two pipes is carried out by screwing the male element at the end of a first pipe into the female element at the end of a second pipe.

Depending on the configuration and thickness of the pipes, it may be advantageous to form the female element on the end of a pipe where the external diameter has previously been expanded, the male element being produced on a pipe the end of which can if necessary have been thickened, for example by hot forming.

In a second variation, the connection for two pipes is of the coupled type, i.e., produced using a coupling joining the two pipes, and employs two connectors of the invention, the structure of which has been described above.

In this case, a male element as described above is formed at each pipe end and a female element as described above is formed at each end of a coupling, the two male elements at the two ends of two pipes to be connected being screwed into the two female elements of the coupling.

In this case, the free ends of the two pipes to be connected can, in a first embodiment, come into a bearing relationship with each other inside the coupling at the end of makeup, thus constituting an abutment which can stop makeup at the set position.

In a second embodiment of the coupled connection, the free end of each pipe comes into a bearing relationship with a stop-lug provided in the central portion of the coupling.

BRIEF DESCRIPTION OF THE DRAWINGS

The accompanying figures and examples describe non limiting examples of the connectors and connections of the invention.

The accompanying figures and examples describe non limiting examples of the connectors and connections of the invention.

DETAILED DESCRIPTION OF THE PREFERRED EMBODIMENTS

In order to represent the invention better, the accompanying Figures are deliberately diagrammatic; the dimensions, angles and the ratios of the dimensions are not necessarily respected, some of the dimensions being considerably exaggerated.

Figure 11:
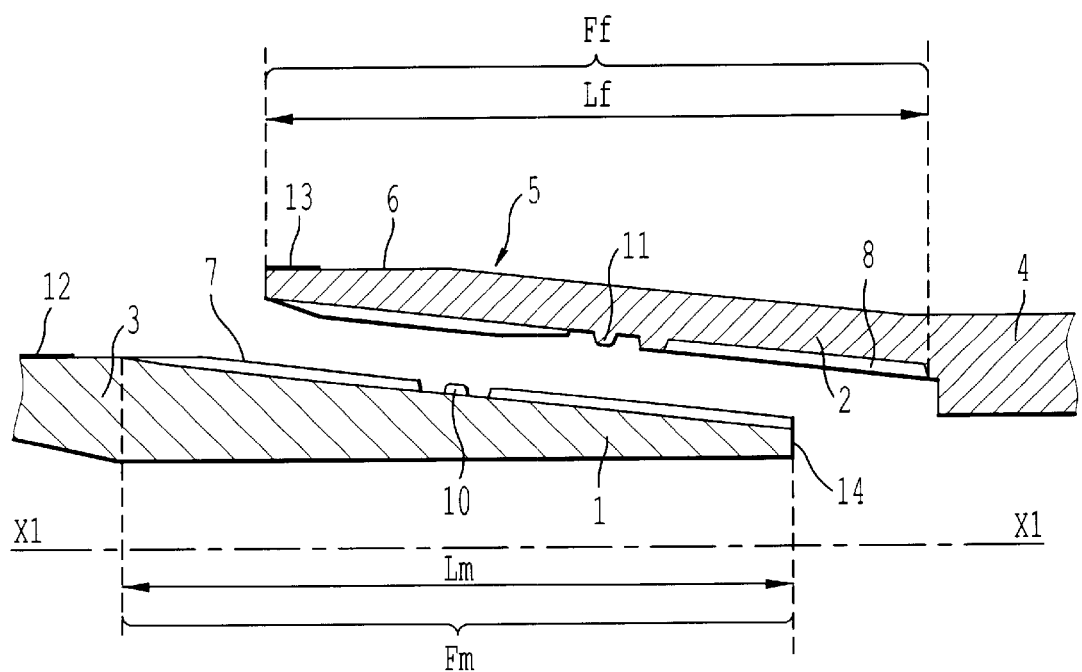
FIG. 11 shows a partial axial cross-section of the male element on one end of a pipe that has been thickened, and the female element at one end of a pipe that has been expanded, of a threaded connector in a non-connected position.

FIG. 11 shows a partial axial cross-section of the male element 1 on one end of a pipe that has been thickened, and the female element at one end of a pipe that has been expanded, of a threaded connector in a non-connected position.

Figure 12:
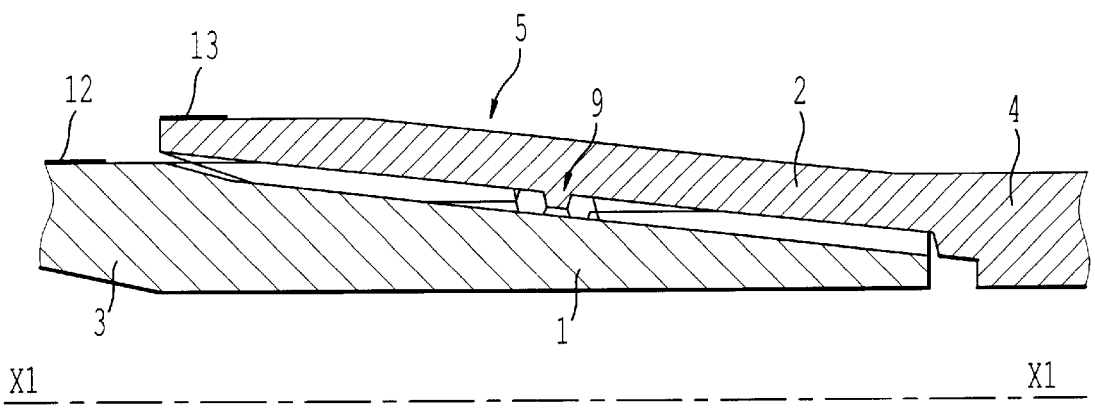
FIG. 12 shows the connector of FIG. 11 in the connected position.

FIG. 12 shows the connector of FIG. 11 in the connected position.

In order to represent the invention better, the accompanying Figures are deliberately diagrammatic; the dimensions, angles and the ratios of the dimensions are not necessarily respected, some of the dimensions being considerably exaggerated.

Figure 1:
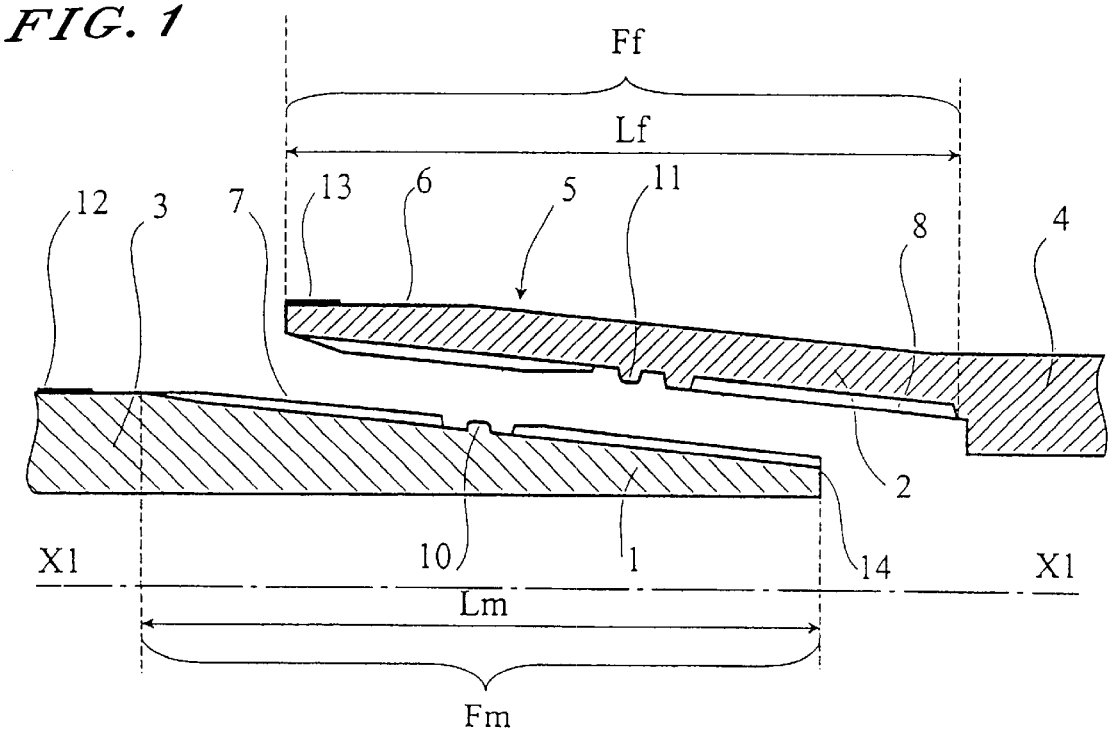
FIG. 1 shows a partial axial cross-section of the male and female element of a threaded connector of the invention in a non-connected position.
Figure 2:
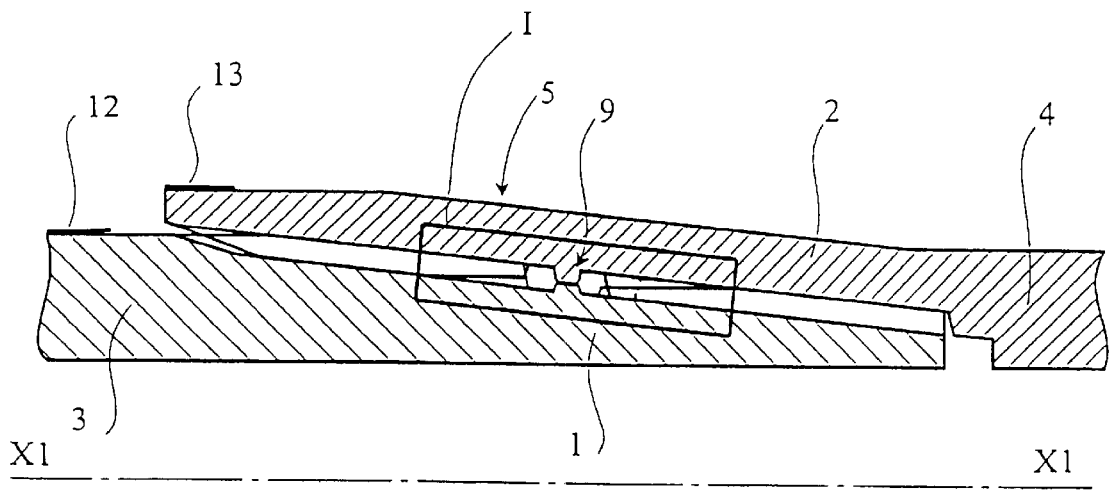
FIG. 2 shows the connector of the invention of FIG. 1 in the connected position.

FIGS. 1 and 2 show a partial axial cross section through a plane passing through their common axis X1—X1 of a male element 1 and a female element 2 respectively disposed at the end of a first steel pipe 3 and a second steel pipe 4 of a threaded connector 5 of the invention.

These male and female elements 1, 2 are shown connected in FIG. 2, connector 5 being in its made up position. FIG. 1 shows them before makeup.

To better illustrate the connector before connection, female element 2 is shown radially offset from its axis X1—X1 in FIG. 1.

The external diameter of end 6 of pipe 4 on which female element 2 is formed is greater than the diameter of the continuing portion 4 of the pipe, this diameter at 6 having been produced by expanding the pipe end.

Male element 1 comprises an external male threading 7 constituted by a male threaded zone Fm. Threading 7 is tapered and is diagrammatically represented, as is the custom, by the two tangential generatrices of the threadings respective to the thread crests and roots.

This threading 7 is produced on a single taper and the thread has a known geometry and is of a type which is suitable for the desired application for the connector and its service conditions.

In contrast to threaded connectors where the threading comprises, on each male and female element, two radially and axially offset independent threaded zones (or two threaded steps), such as in the connector described in EP 0 767 335, the connector of the present invention is defined as a connector with a threading constituted by a single threaded zone.

Thus male threaded zone Fm is considered to be a single male threaded zone the length Lm of which covers the axial length of the threading from one end to the other, this length including the imperfect or vanishing or incomplete threads at the ends.

Female element 2 has an internal tapered female threading 8 which corresponds to male threading 7 and is constituted by a single female threaded zone Ff, shown in analogous fashion to threading 7.

It comprises a single threaded zone the length Ff of which covers the axial length of the threading from one end to the other, this length including the imperfect or vanishing or incomplete threads at the ends.

A central sealing means 9 is interposed between male element 1 and female element 2 at threadings 7, 8.

This means 9 is constituted by a male bearing surface 10 and a female bearing surface 11 respectively disposed in a globally central zone of the male threaded zone Fm and the female threaded zone Ff where the respective male and female threadings have been interrupted, these two bearing surfaces 10 and 11 being capable of coming into mutual bearing contact in the connected position of the connector as shown at 9 in FIG. 2.

Thus the metal-metal contact pressure between surfaces 10 and 11 creates a seal in the form of a continuous annular surface which resists any penetration of fluid from the exterior of pipes 3, 4 to the interior or vice versa.

The term "globally central zone of the male threaded zone Fm and female threaded zone Ff" means a zone situated mid-way along lengths Lm and Lf or a zone which extends either side of the mid point of lengths Lm and Lf by an amount equal to a ¼ of the threaded lengths Lm, Lf, this position being selected as a function of the external pressures of the fluids which are to be resisted and of the pipe thickness.

In order for surfaces 10 and 11 to coincide perfectly at the end of makeup, the connector of the invention comprises a stop means which can stop makeup at a set relative axial position of male element 1 with respect to female element 2. In the case of FIGS. 1 and 2, this stop means is constituted in a known manner by two marks 12, 13 shown as a thick line on male element 12 and on female element 13. Makeup of elements 1, 2 can be stopped when these marks 12, 13 coincide, as shown in FIG. 2.

These marks 12, 13 are positioned such that a certain interference fit is developed between male threading 7 and female threading 8 as a result of the tapered form of the threads which enables a thread interference fit to be produced between male threading 7 and female threading 8.

The term "interference fit" means the positive difference existing before makeup at the level of zones Lm and Lf between the radius with respect to the axis of the connector at a point on the male threaded zone 7 and that of the corresponding point on the female threaded zone after makeup.

Advantageously, the interference fit measured with respect to the connector axis between bearing surfaces 10, 11 is arranged to be at least equal to and preferably greater than the interference existing between threads 7, 8, thus reducing the makeup track for the bearing surfaces up to the connected position.

Figure 5:
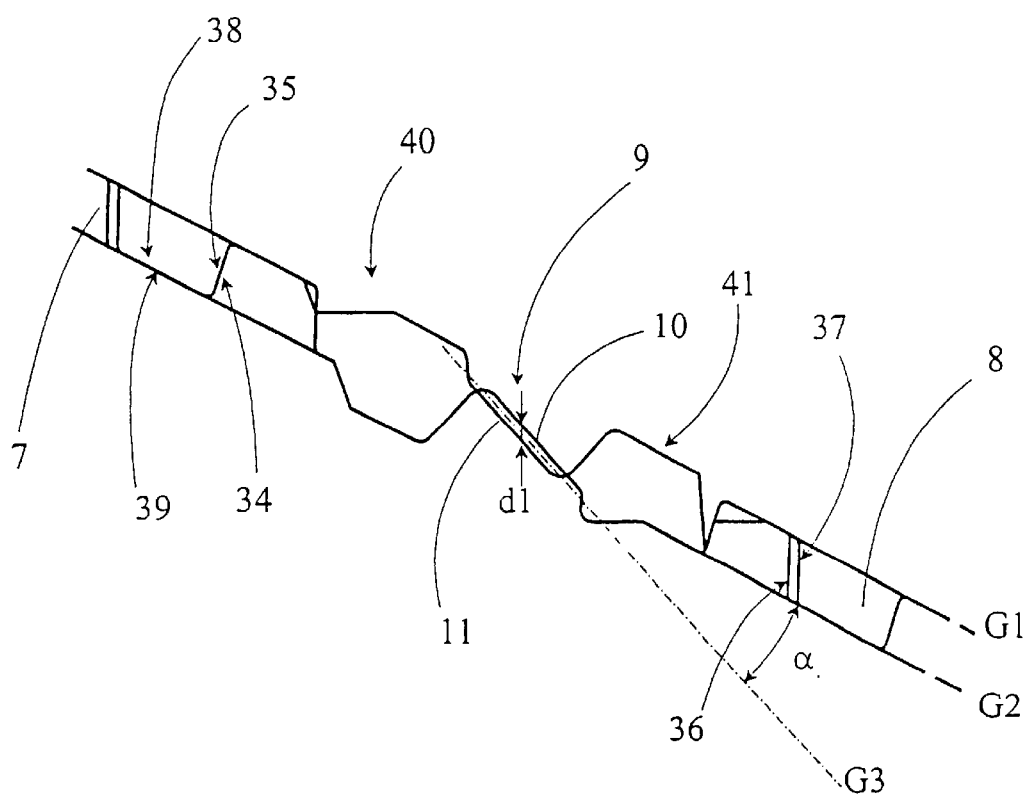
FIG. 5 is an enlarged representation of portion I of FIG. 2 showing a first embodiment of the central sealing means of the connector of the invention.
Figure 6:
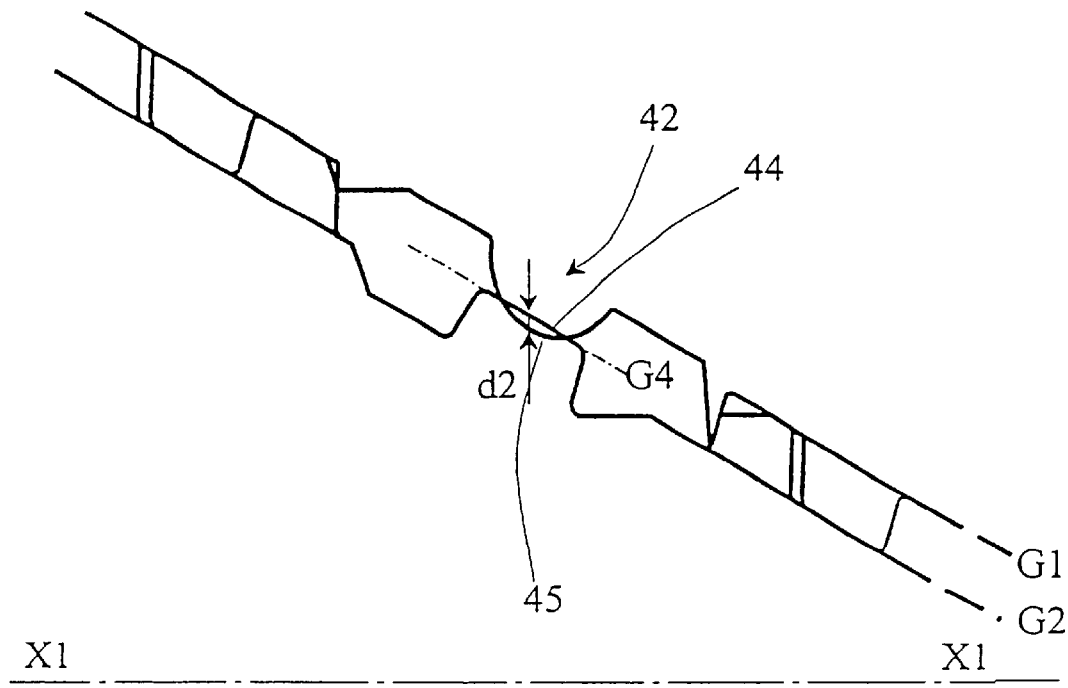
FIG. 6 is a variation of FIG. 5 and shows a further embodiment of the central sealing means of the connector of the invention.
Figure 7:
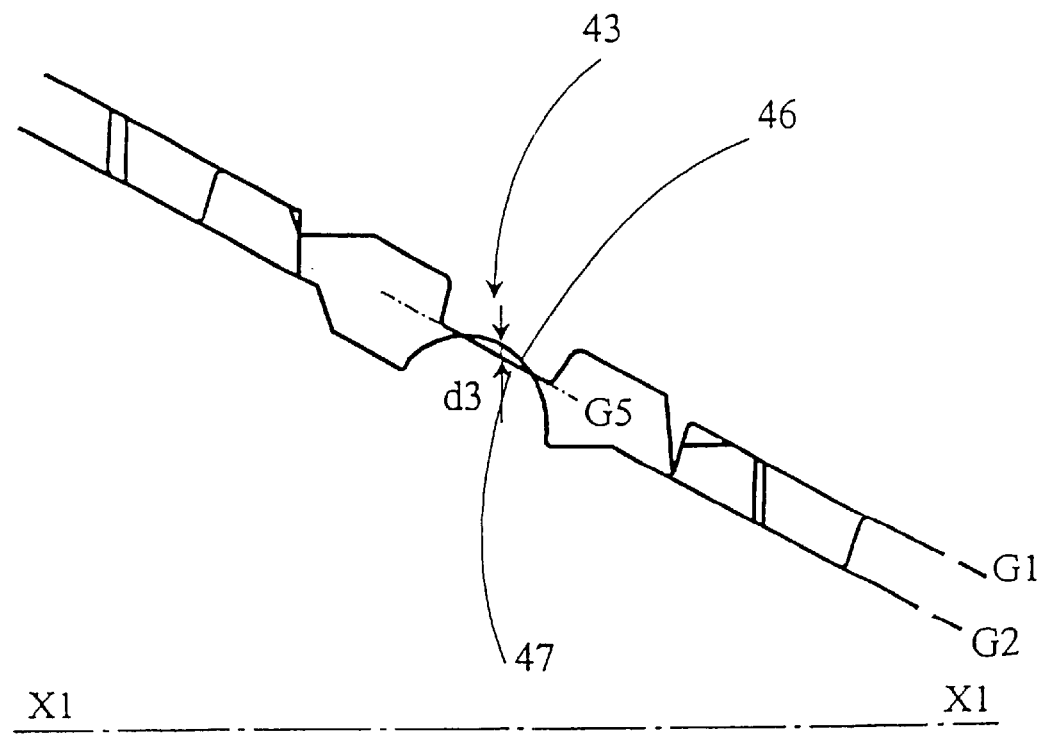
FIG. 7 is a further variation of FIG. 5 and shows a further embodiment of the central sealing means of the connector of the invention.

Either side of central sealing means 9, the threadings, both of the male threaded zone Fm and of the female threaded zone Ff, have been interrupted such that the connector can be made up and broken out without difficulty as will, for example, be seen in FIGS. 5, 6 and 7.

The seal obtained with the central sealing means 9 described above is particularly effective against high external pressures because the male and female bearing surfaces 10, 11 in the globally central position are supported by a sufficiently high thickness of metal with respect to the pipe thickness both in male element 1 and in female element 2.

Advantageously, at least for certain conditions of service, care is taken such that on male element 1, the thickness of the material at the level of the male bearing surface is at least 50% of the thickness of pipe 3.

Such conditions are impossible to satisfy when the sealing surface of the connector is located beyond the threading at the end of the male element as is the case, for example, in EP 0 488 912.

Increasing the thickness at the level of this bearing for the male element causes a problem since the connector would have to have too low a taper which would cause difficulties as regards engaging the male element in the female element and would necessitate a diameter and length which would be too high and thus too expensive for the female element.

The connector of the invention can be produced from a conventional tapered threading with a single threaded zone.

Thus much thinner pipes are needed than prior art connectors where the threading comprises two independent axially and radially offset threadings or steps. The connectors of the invention are thus much more compact, cheaper as regards materials and simpler to machine.

Further, because of the globally central position of the central sealing means 9, the male threaded zone can extend to the end 14 of the male element with perfect threads, from which point the efficiency of the female element 2 is calculated.

Thus the bulk of the connector can be reduced as regards the female element, i.e., the external diameter of this female element 2 can be reduced with respect to a conventional connector provided with sealing surfaces at the end of the male element.

Similarly, female threading 8 can be prolonged towards the free end of the female element until the appropriate external diameter of pipe 3 is attained. Thus the connector efficiency is 100% of pipe 3. This is not possible with a connector provided with bearing surfaces at the free end of the female element.

FIG. 11 shows a partial axial cross-section of the male element 1 on one end of a pipe that has been thickened, and the female element 2 at one end of a pipe that has been expanded, of a threaded connector in a non-connected position. FIG. 12 shows the connector of FIG. 11 in the connected position.

Figure 3:
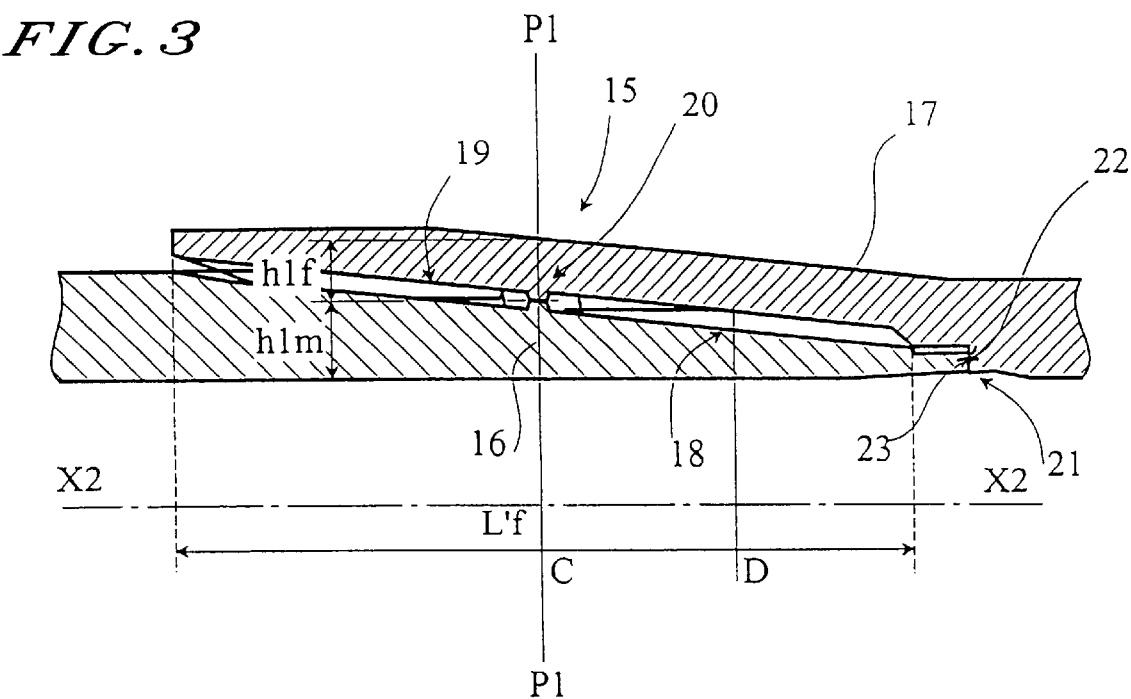
FIG. 3 shows a partial axial cross-section of the connector of the invention in the connected position, this connector being a variation of the connector of FIG. 2.

FIG. 3 shows a variation of the connector of FIGS. 1 and 2.

This connector 15 is shown in the connected position as a partial axial cross section; only the portion above axis X2—X2 is shown.

As with connector 5 in FIGS. 1 and 2, it comprises a male element 16 and a female element 17 which are each provided with a respective male 18 and female 19 single tapered threaded zone.

A central sealing means 20 is disposed in the globally central zone of male 18 and female 19 threadings, here substantially at the mid point of length L'f in female threaded zone 19.

The stop means enabling makeup of male element 16 into female element 17 to be stopped into a set position is constituted here by an abutment 21 formed by an internal shoulder 22 on the female element, the shoulder being transverse to axis X2—X2 on which end 23 of male element 16 bears, which end has been provided with the desired shape so that it bears on shoulder 22.

Thus makeup when connecting connector 15 is stopped by abutment 21 when the desired makeup torque is reached.

Clearly, matters are arranged so that both the threadings 18, 19 and the central sealing means 20 provide an interference fit as a result of existing interferences.

If needed, in this case it wilt be possible to use "buttress" type (as termed by the American Petroleum Institute) male and female threadings 18, 19 with negative flanks in order to provide better engagement of the male threading 18 in the female threading 19 and thus to place in bearing contact the flanks of the threadings which are on the side opposite the abutment 21.

Figure 4:
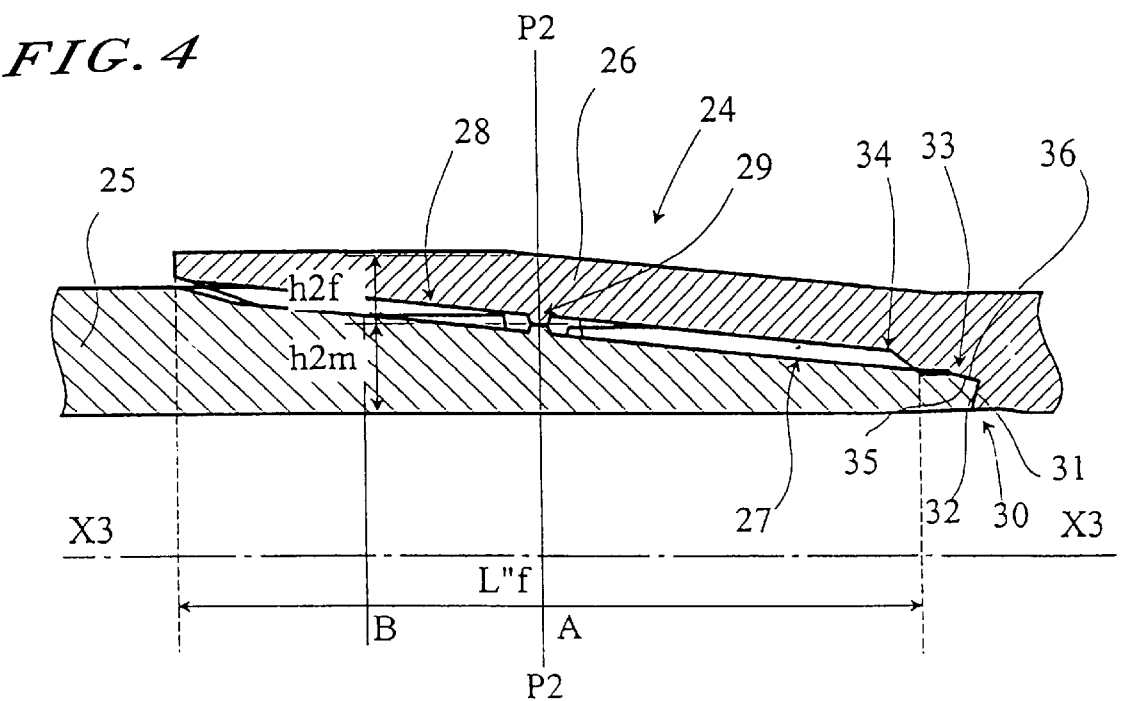
FIG. 4 shows a partial axial cross-section of the connector of the invention in the connected position, this connector being a further variation of the connector of FIG. 2.

FIG. 4 shows an axial partial cross section above axis X3—X3 of a further variation of the connector of FIGS. 1 and 2.

In its connected position, this connector 24 has a male element 25 and a female element 26 each provided with a respective male 27 and female 28 single tapered threaded zone.

A central sealing means 29 is located substantially midway along the length L"f of the female threaded zone 28. Like the means of FIG. 1, this means is constituted by a male sealing surface and a female sealing surface bearing one against the other in the connected position.

Here, the stop means enabling makeup of the male element 25 into female element 26 to be stopped in a set position is constituted, in a manner similar to the example of FIG. 3, by an abutment 30, the tapered convex shoulder 31 of the female element acting as a bearing surface for the corresponding concave tapered end 32 of male element 25.

In this case abutment 30 has a re-entrant taper, such an abutment being known as such, while in the case of FIG. 3, abutment 21 is perpendicular to axis X2—X2.

Further, connector 24 comprises a second sealing means 33 located between internal end 34 of male 27 and female 28 ends and the abutment 30, which means is constituted by a male convex tapered surface 35 which in the connected position comes into close bearing contact with a corresponding female concave tapered surface 36.

While the central sealing means 29 can act to ensure a seal against fluid inside the pipe and against fluid outside the pipe, in some particularly severe cases it may be important to reserve the central sealing means 29 as a seal against external fluid and as is the case of FIG. 4, to provide a second sealing means 33, in this case in the form of sealing surfaces but this is not limiting, which ensures a tight seal against internal fluid.

In a variation, this sealing means can be constituted by a sealing ring, for example, a sealing device which is known in itself.

When the connector has a second sealing means such as 33, it is possible to offset the central sealing means 29 towards the end of the female element.

Advantageously, said central sealing means is kept within the limits of segment AB of the female threading with length L"f, A representing the mid point of L"f and B being the point located at the mid point of the half of L"f on the free end side of female element 26.

When the connector comprises only the central sealing means, for example as shown in FIG. 3, if this means is to act both to provide a seal against external and internal material, then advantageously the central sealing means 20 is offset from the central position at the mid length C of the female threading with length L'f by locating it within segment CD representing ¼ of the length of L'f, the offset this time being towards the free end of the male element 16.

In all cases, at the level of the central sealing means (20, 29) in the sectional plane passing through this central sealing means and perpendicular to the axis the trace of which is P1—P1 (FIG. 3) or P2—P2 (FIG. 4), it is ensured that a sufficient quantity of material is provided on the male (h1m, h2m) and female (h1f, h2f) element side to support the sealing surfaces.

By way of non limiting example, h1m, h2m and h1f and h2f, while remaining close to 50% of the thickness of pipe 3, 4, can vary by an amount of the order of 30% to 80% of said thickness.

The values for h1m and h2m may be even slightly higher than 80% of the thickness of the body of the pipe if the diameter of the internal peripheral surface of the male component has been made smaller than the diameter of the body of the pipe, for example by making conical the walls at the male end.

The next FIGS. 5, 6 and 7 show enlarged versions of zone I of FIG. 2 in several variations.

FIG. 5 shows male tapered threading 7 and female tapered threading 8 connected and represented by their respective teeth.

By way of non limiting example, the threading is a trapezoidal API threading of the "Buttress" type which is known in itself with male 34 and female 35 load flanks bearing one on the other, and male 36 and female 37 stabbing flanks.

Crests 38 of the teeth of female threading 8 are in an interference fit against roots 39 of male threading teeth 7 by interference of the threads together and correspondingly for the crests of the male threading which bear against the roots of the female threading.

Clearly, different relationships between the female threading and the male threading can be envisaged but these always produce an interference fit when made up.

As an example crests 38 of the teeth of female threading 8 can be in an interference fit against roots 39 of male threading teeth 7 by interference of the threadings together while the crests of the male threading do not bear against the roots of the female threading.

G1 and G2 represent the generatrices of cones which define the maximum spatial requirement of male 7 and female 8 threadings. The slope of the generatrices has been deliberately exaggerated to facilitate comprehension.

Both the male 7 and female 8 threading have been interrupted over a set length to make room for central sealing means 9. This length can vary by an amount of the order of 3 to 5 pitches of the threading.

Male 10 and female 11 bearing surfaces which form the sealing means 9 are parallel truncated conical surfaces with generatrix G3 the slope of which is advantageously higher than the slope of the threadings.

The difference a between the slope of generatrices G1, G2 and the slope of the generatrix of the bearing surfaces G3 is preferably limited to 20°.

When the connector is made up, surfaces 10, 11 bear against each other with a contact pressure which ensures a seal.

This contact pressure is all the higher as the value of the interference at surfaces 10, 11 is higher, this interference causing elastic deformation which is the source of said pressure.

FIG. 5 deliberately shows surfaces 10, 11 by their geometry before makeup so as to represent the real interference between these two surfaces, namely d1 which is measured perpendicular to connector axis X1—X1. The higher the value of the interference, the higher the contact pressures of the surfaces.

When the surfaces are in contact with a contact pressure against each other, in the made up state, the contact line is along generatrix G3.

Bearing surfaces 10, 11 are surrounded by clearances 40, 41 which are required upstream and downstream to allow the male element to engage in the female element and makeup without any problems and also to allow the machining tools to disengage.

FIGS. 6 and 7 represent variations of the central sealing means 42, 43.

In FIG. 6, male bearing surface 44 is constituted by a truncated surface the generatrix G4 of which is parallel to generatrices G1 and G2 of threads 7, 8. The female bearing surface 45 is constituted by a toric surface.

In FIG. 7, the male bearing surface 46 is toric and the female bearing surface is truncated with a generatrix G5 which is parallel to generatrices G1 and G2.

The interferences of the bearing surfaces are shown in FIGS. 6 and 7 at the point where they are a maximum, namely d2, d3, respectively.

The bearing surfaces shown in FIGS. 6 and 7 have the advantage of being surfaces with a makeup track which is shorter than surfaces 10 and 11 in FIG. 5. However, the distribution of the contact pressures which surfaces 44/45 or 46/47 develop is different from that for surfaces 10, 11.

The surfaces of the male and female bearing covered by the invention can be of any form provided that they can bear one against the other in the connected position of the connector.

Advantageously, the maximum bulk of these bearing surfaces is defined by the space existing between generatrices G1 and G2 which define the limits of the space requirements of the threading.

In practice, in order to reinforce the effect of the central sealing means 9, 42, 43, and/or the mutual bearing of the surfaces 10–11, 44–45, 46–47 respectively and also when the connector comprises a second sealing means such as 33, if needed for possibly reinforcing the efficiency of this second sealing means, one can be led to reduce or even cancel the radial interference between the thread crests and thread roots of one of the portions of the threadings located on one side of the central sealing means.

For that purpose on one of the 2 elements, i.e. on the male element or on the female element of the connector, one can set off, by a distance measured with respect to the axis of the connector in the range of 0,005 mm to 0,10 mm, the position of the generatrices G1 and G2 by dealing separately with the portion of the generatrix G1 if one works on the male threading or of G2 if one works on the female threading, said portion being shown in figures such as 5, 6, 7 on the left side of the central sealing means, and with the portion of generatrix G1 or G2 which is shown in figures such as 5, 6, 7 on the right side of the central sealing means.

In such a way both portions of generatrix G1 or G2, that is to say the portion which is situated on the left side of the central sealing means and the portion which is situated on the right side, remain parallel while being slightly radially offset by the quantity indicated with respect to the axis of the connector.

The global functioning of the connector which has just been described immediately above and which remains fundamentally based on a single female threaded zone and on a single male threaded zone such as they have been described previously in the present text, has not been modified for all that in its principle and the sealing characteristics can benefit in each specific case by the radial offset of one of the threadings, male or female one, between both sides of the zone of the central sealing means.

Figure 8:
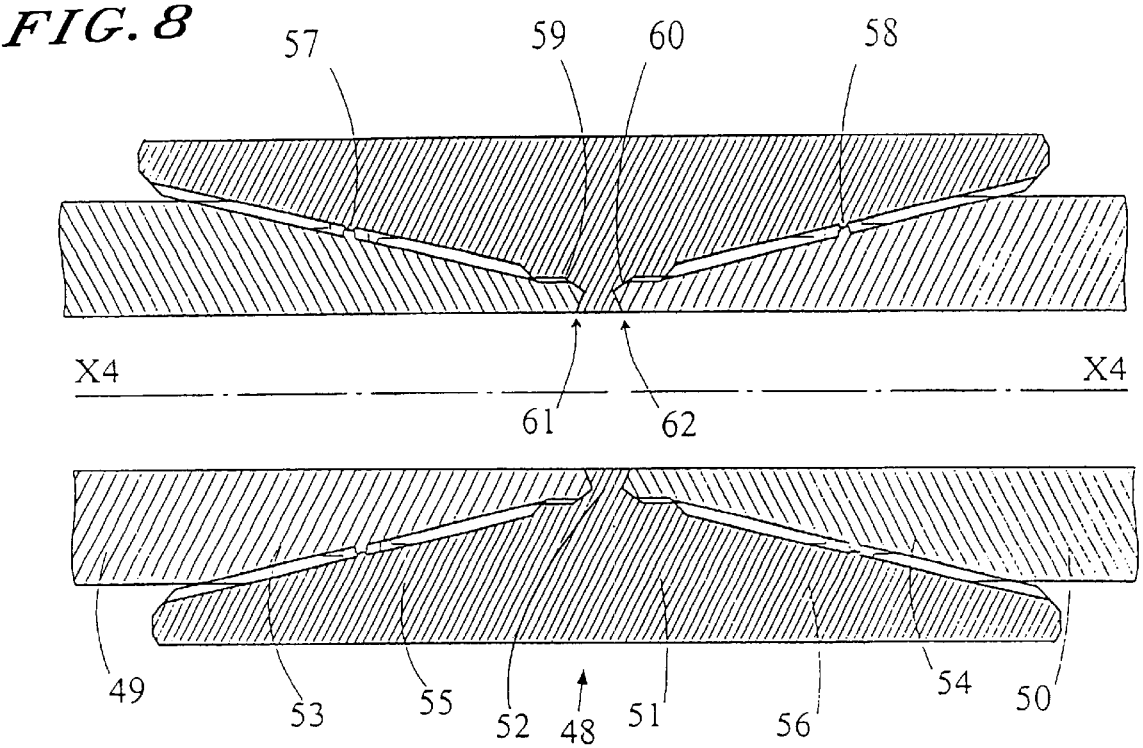
FIG. 8 shows an axial cross section in the connected position of a threaded and coupled connection of the invention using two threaded connectors of the invention, the coupling comprising a central stop-lug.
Figure 9:
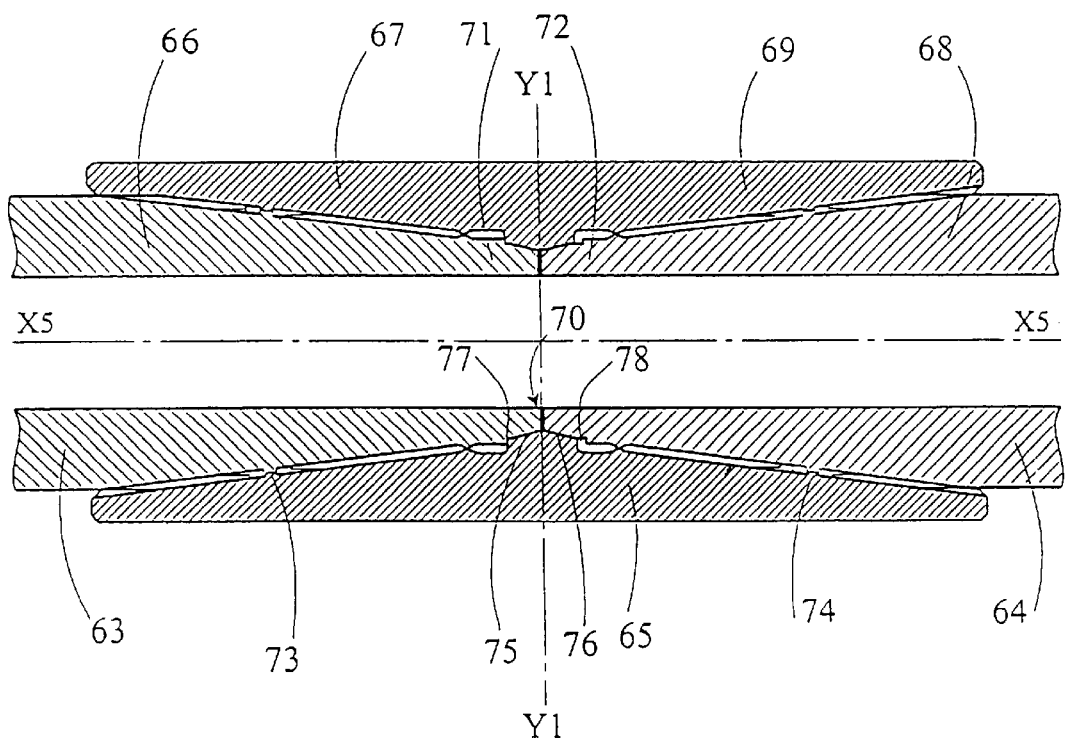
FIG. 9 shows an axial cross section in the connected position of a further threaded and coupled connection of the invention, which uses two threaded connectors of the invention, the coupling not having a central stop-lug.
Figure 10:
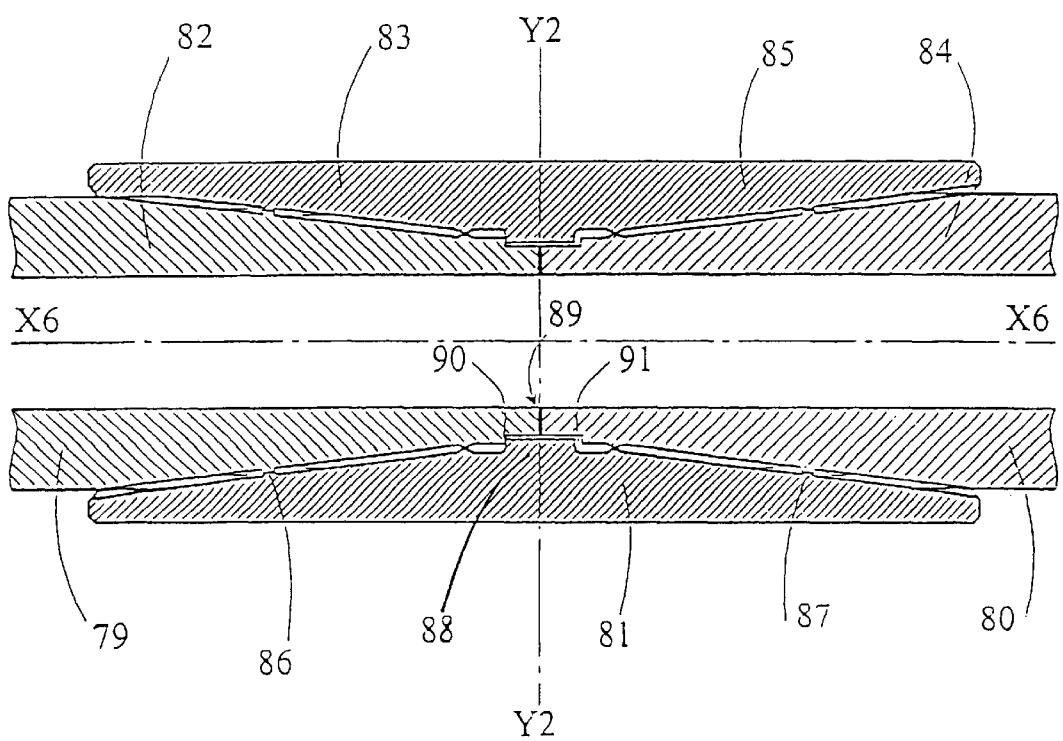
FIG. 10 shows an axial cross section in the connected position of a still further threaded and coupled connection of the invention which uses two threaded connectors of the invention, the coupling not having a central stop-lug.

FIGS. 8, 9 and 10 show three embodiments of a coupled type connection between two pipes each using two connectors of the invention.

FIG. 8 shows an axial cross section passing through axis X4—X4 of connection 48 of two pipes 49, 50 using a coupling 51.

Each pipe to be connected 49, 50 comprises a male element 53, 54 at its end.

Coupling 51 is provided with a central stop-lug 52 and each end of coupling 51 comprises a female element 55, 56.

The respective association of elements 53–55 and 54–56 each constitute a connector of the invention.

Male elements 53, 54 and female elements 55, 56 are such that their structure corresponds to the description which was made above and which associated together each constitute a connector of the invention. In this case, as in FIG. 4, each connector comprises a second sealing means 59, 60 of the type described at 33 in FIG. 4 in addition to the central sealing means 57, 58.

The stop means for stopping makeup of the male element into the female element in a set position is constituted here by a stop-lug 52 of coupling 51 which acts as an abutment 61, 62 of the same type as the abutment shown at 30 in FIG. 4.

The connection of the invention is thus constituted by two connectors, also of the invention.

FIG. 9 is a variation of the embodiment of FIG. 8 and shows an axial cross section along X5—X5 of a connection of the invention connecting two pipes 63, 64 via a coupling 65.

In contrast to FIG. 8, coupling 65 does not include a lug like stop-lug 52 in FIG. 8.

In this case the two connectors of the invention, constituted by respective male and female elements 66–67 and 68–69 which form the connection, include a common abutment 70 formed by bringing the ends 71, 72 of male elements 66, 68 into bearing contact with each other.

This common abutment constitutes a common means for these two connectors of the invention to stop make up at a set position to cause the male and female bearing surfaces of the central sealing means 73, 74 of each connector to coincide perfectly.

Further, a second sealing means is provided at 75, 76 in the central zone of the coupling beyond the threaded zones of the connectors constituting the connection which here is produced in known manner by metal-metal bearing of the two interfering surfaces which are tapered, for example.

To increase the precision of the central positioning of the common abutment 70, steps 77, 78 are produced in the form of shoulders both on the male element 66, 68 of each connector forming the connection and on the female element 67, 69.

The axial distance between the female shoulders formed in coupling 65 is arranged so as to be slightly smaller than the axial distance between the male shoulders when ends 71, 72 of male elements 66, 68 are bearing on their common abutment 70, such that these shoulders never oppose the bearing contact of ends 71, 72 of male elements 66, 68.

FIG. 9 also shows that only one side of step 77 of the male and female shoulders are in contact, a slight axial play existing on the side of step 78 between the corresponding male and female shoulders.

The position of the respective male and female shoulders of steps 77, 78 are arranged so that the common abutment 70 is formed during makeup in the central portion of the coupling, i.e., on the plane of its axis of symmetry Y1—Y1 or in the immediate vicinity thereof.

FIG. 10 is a variation of the embodiment of FIG. 9 and shows an axial cross section along X6—X6 of a connection of the invention joining two pipes 79, 80 via a coupling 81.

In contrast to FIG. 9, the two connectors of the invention constituted by respective male and female elements 82–83 and 84–85 which form the connection each comprise only their central sealing means 86, 87.

In contrast to FIG. 8 and 9, there is no second sealing means.

The connection also comprises a common abutment 89 and steps 90, 91 formed both on the male elements 82, 84 and on female elements 83, 85 which act to precisely position this abutment 89 in or close to the plane of symmetry Y2—Y2 of the coupling.

The desired axial play is provided so that these steps function analogously to that described for FIG. 9.

In contrast, central zone 88 of the connection does not have a sealing surface and the non threaded end of male elements 82, 84 slide with free radial play in the central zone 88 of coupling 81 until abutting at 89.

Clearly, a connection of two pipes of the integral type can be made in accordance with the invention using a single connector of the invention.

For such a connection reference should be made to FIGS. 1 and 2, for example as well as to FIGS. 3 and 4.

In this case, each pipe 3, 4 to be connected carries alternately at its ends a male element or a female element of the invention and the connection is made by making up a male element 1 on one end of a first pipe 3 into a female element 2 at one end of a second pipe 4.

As has been shown in the above description, the connector of the invention and the connections produced with these connectors are particularly compact while having the desired external and internal sealing qualities.

This results from the fact that the threading is constituted by a single threaded zone, without a break in alignment of the taper on which they are formed, in contrast to existing connectors comprising two radially and axially offset threaded zones.

Further, because of the position of the central sealing means, the perfect threads of the threading can be extended to the two ends when no second sealing means is added.

This means that the tension efficiency (critical section) of the connector is higher than that of the connector of the same dimensions with sealing surfaces at the ends of the threadings.

Clearly, the taper of the threading is selected so that the male element engages easily in the female element.

Advantageously and in a non limiting manner, threadings are selected wherein the slope with respect to the axis is 2.86° or more.

The connector and connection of the invention, which are intended to resist high pressures, will usually but not exclusively be produced from thick, large diameter pipes.

A large number of variations of the invention can be made, all of which are within the scope of the claims of the present patent.

What is claimed is:

1. A threaded pipe connector comprising a male element disposed at an end of a first pipe and a female element disposed at an end of a second pipe and a sealing means, the male element comprising an external tapered male threading and the female element comprising an internal tapered female threading which corresponds to the male threading, wherein the male threading comprises a single male threaded zone disposed on a surface generated by a first straight line of a first cone and the female threading comprises a single female threaded zone disposed on a surface generated by a second straight line of a second cone, and the sealing means is a central sealing means formed by a male bearing surface and a female bearing surface which can bear on each other in a connected position of the connector, the male and female bearing surfaces being disposed in a globally central zone of the male threaded zone for the male bearing surface and of the female threaded zone for the female bearing surface within which the respective male and female threadings are interrupted, a stop means also being provided to stop makeup of the male element in the female element in a set position in the connected position of the connector.

2. A connector according to claim 1, wherein the male threaded zone and the female threaded zone include both perfect threads and threads with imperfect or vanishing or incomplete ends.

3. A connector according to claim 1, wherein the central sealing means is disposed in a zone which extends from a mid point of the male or female threaded zone by a length at most equal to ¼ of a length of said threaded zone to each side of said mid point.

4. A connector according to claim 1, wherein the stop means which can stop makeup of the male element into the female element in the set position in the connected position of the connector is constituted by a means directly linked to the threadings.

5. A connector according to claim 1, wherein the stop means which stops makeup of the male element into the female element in the set position in the connected position of the connector is constituted by a means which is independent of the threadings.

6. A connector according to claim 5, wherein the means which is independent of the threadings comprises an abutment.

7. A connector according to claim 1, wherein at least one of the bearing surfaces, the male surface, or the female surface of the central sealing means is constituted by a tapered surface, a taper of which is in a same direction as a taper of the threading, and wherein an angle with respect to an axis of the connector is larger than an angle of the taper of the threading with respect to the axis.

8. A connector according to claim 7, wherein the angle of the tapered bearing surface with the connector axis is larger by a value of at most 20° than the angle of the taper of the threading with respect to the axis.

9. A connector according to claim 1, wherein a maximum spatial requirement of the male and female bearing surfaces is defined by a space existing between generatrices defining limits of the maximum spatial requirement of the threadings.

10. A connector according to claim 9, wherein a portion of the generatrices defining the limits of the maximum spatial requirement of the threadings which is located on one side of the central sealing means is for one of the threadings, the male or the female one, slightly radially offset with respect to an axis of the pipe of a portion of a same generatrix located on another side of the central sealing means.

11. A connector according to claim 1, wherein the male bearing surface and the female bearing surface of the central sealing means comprise two tapered surfaces, and the taper of the sealing means is greater than the taper of the male and female threadings.

12. A connector according to claim 1, further comprising a second sealing means.

13. A connector according to claim 12, wherein the second sealing means is provided by a male bearing surface located close to a free end of the male element and a female bearing surface located on a corresponding portion of the female element, the male and female surfaces coming into bearing contact with each other during makeup of the connector.

14. A connector according to claim 1, wherein interference at the male and female bearing surfaces of the central sealing means is higher than interference between the male threading and the female threading.

15. An integral type threaded connection for first and second pipes, produced by a connector according to claim 1, the male element of the connector being formed at an end of the first pipe, the female element being formed at an end of the second pipe.

16. A connection according to claim 15, wherein the female element is produced at one end of the pipe which has been expanded, the male element being produced at one end of the pipe which has been thickened.

17. A threaded and coupled type connection for first and second pipes, produced by two connectors according to claim 1, one male element being formed at each end of the pipes, a female element being produced at each end of a coupling, one male element of each pipe being connected in each female element of one end of the coupling.

18. A connection according to claim 17, wherein in the connected position, the free end of each male element comes into bearing contact with a portion of the coupling forming a central stop-lug to produce two abutments.

19. A connection according to claim 17, wherein in the connected position, two free ends of the male elements come into bearing contact with each other thus forming a common abutment.

20. A connection according to claim 19, wherein steps forming shoulders are formed in each male element and each female element close to the central portion of the coupling, which shoulders enable said common abutment to be precisely positioned.

* * * * *

UNITED STATES PATENT AND TRADEMARK OFFICE
CERTIFICATE OF CORRECTION

PATENT NO. : 6,543,816 B1
DATED : April 8, 2003
INVENTOR(S) : Thierry Noel

It is certified that error appears in the above-identified patent and that said Letters Patent is hereby corrected as shown below:

Column 1,
Lines 11-15, please delete in its entirety the duplicate paragraph at line 11, beginning with "The present invention relates to a threaded …"
Lines 25-30, please delete in its entirety the duplicate paragraph at line 25, beginning with "Pipe connectors used in the petroleum …"

Column 2,
Lines 54-56, please delete in its entirety the duplicate paragraph at line 54, beginning with "The present invention seeks to provide …"

Column 5,
Lines 30-32, please delete in its entirety the duplicate paragraph at line 30, beginning with "The accompanying figures and examples describe …"

Column 6,
Lines 14-18, please delete in its entirety the duplicate paragraph at line 14, beginning with "FIG. 11 shows a partial axial …"
Lines 19-20, please delete in its entirety the duplicate paragraph at line 19, beginning with "FIG. 12 shows the connector of FIG. 11 …"
Lines 21-25, please delete in its entirety the duplicate paragraph at line 21, beginning with "In order to represent the invention better, the …"

Column 9,
Line 1, change "case it wilt be possible" to -- case it will be possible. --

Signed and Sealed this

Seventeenth Day of February, 2004

JON W. DUDAS
*Acting Director of the United States Patent and Trademark Office*